UNITED STATES PATENT OFFICE.

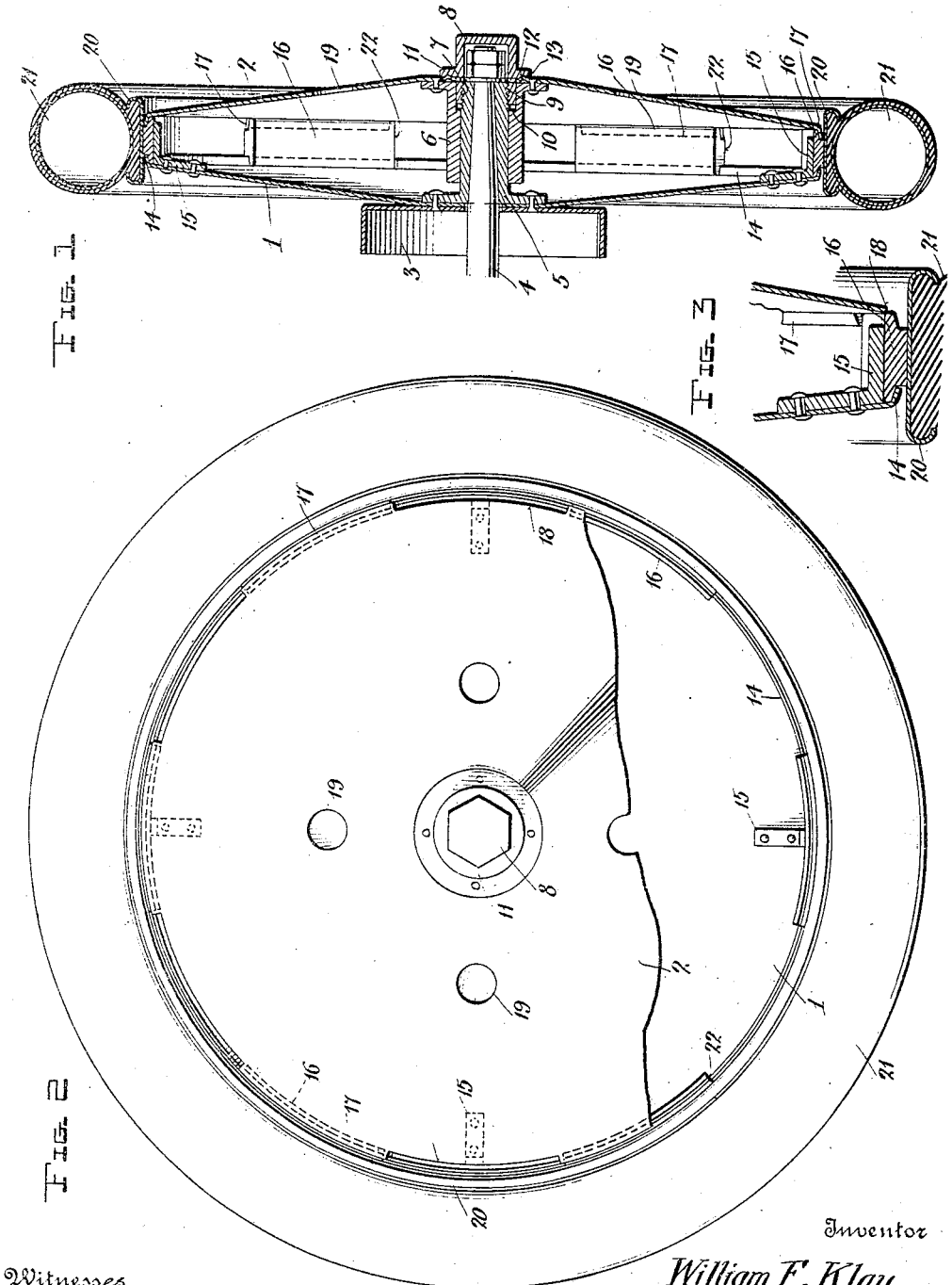

WILLIAM F. KLAY, OF MODESTO, CALIFORNIA.

VEHICLE-WHEEL.

1,371,793. Specification of Letters Patent. Patented Mar. 15, 1921.

Application filed January 14, 1920. Serial No. 351,332.

*To all whom it may concern:*

Be it known that I, WILLIAM F. KLAY, a citizen of the United States, residing at Modesto, in the county of Stanislaus and State of California, have invented new and useful Improvements in Vehicle-Wheels, of which the folowing is a specification.

This invention relates to improvements in vehicle wheels of the disk type wherein two metal disks constitute the body of the wheel.

The objects are to provide a wheel having comparatively few parts serving to maintain a tire in proper position and facilitate ready removal and replacement of the tire and rim without disconnecting the disks from one another.

With these and other objects in view, my invention consists in certain features of structure and combination which will be hereinafter set forth.

One embodiment of the invention is illustrated in the accompanying drawings, wherein:—

Figure 1 is a transverse section of the improved wheel shown applied to the axle of a vehicle.

Fig. 2 is a side elevation, a portion of the wheel body being broken away.

Fig. 3 is a transverse section of the rim and a portion of the wheel in position to permit removal of the tire.

Referring to the drawings, wherein similar numerals denote like parts throughout the several views:

The wheel comprises an inner disk 1 and an outer disk 2, preferably of steel, and to the inner disk a common form of brake drum 3 is secured. The wheel is shown mounted on an ordinary axle 4 through the medium of a hub which consists of a sleeve 5 rigidly secured to the disk 1 and through which the axle skein extends, and a sleeve 6 rigidly secured to the outer disk 2 and surrounding the sleeve 5. The sleeve 5 is provided at its outer end with external screw threads 7, and the disks are secured in position on the axle by means of an inclosing cap 8 which has internal threads 9 at its inner end to fit over the axle end to coöperate with the threaded sleeve 5 of the inner disk, the threaded end of the cap 8 extending into an annular recess 10 of sleeve 6. Cap 8 also has an annular flange 11 adapted to bear against the face of the outer disk. This flange is preferably formed with recesses 12 on its inner face, and the outer disk provided with bosses 13 which are adapted to coöperate with the recesses to retain the cap in position.

The inner disk 1 has a peripheral flange 14 and is provided adjacent such flange with a plurality of brackets 15 for supporting the rim 16. The outer disk 2 has a series of peripheral flanges 17 and peripheral recesses 18 and is provided with a plurality of apertures 19 for the insertion of a suitable tool to turn the disk. The rim 16, which is secured to a usual clencher rim 20, carrying a tire 21, is formed with a plurality of recesses 22 which are the same in number and corresponding to the recesses 18 on the outer disk.

When it is desired to remove the tire and rim from the wheel cap 8 is loosened. The outer disk may then be turned until the recesses on its periphery are out of registry with the recesses of the rim section, whereupon the rim and tire may be removed from the wheel without further dismantling the wheel structure. It will thus be seen that removal and replacement of the tire may be effected without disconnecting the disk portions from one another or without removing the wheel from the axle and by making one adjustment only, thereby avoiding the necessity of using and removing and resetting a number of bolts, screws or other fastening means.

Having described my invention, what I claim is:

1. In a vehicle wheel, an inner disk having a hub element secured thereto and also provided with outer peripheral brackets, an outer disk having a hub element attached thereto and movably fitted over and projecting reversely to the hub element of the inner disk, the two hub elements being disposed interiorly between the disks, a rim secured to the peripheral edges of said disks, and means connected to the hub element of the inner disk and engaging the hub element of the said outer disk and also the latter disk for securing the rim in position relatively to both disks and holding the hub element of the outer disk on the hub element of the inner disk.

2. In a vehicle wheel, a disk having a sleeve secured thereto and constituting a part of the hub of the wheel and adapted to receive an axle skein, the sleeve being formed with screw threads on its outer end, a second disk having a sleeve secured to and extending therefrom to fit over the first named sleeve and also constituting a part of the hub, the peripheries of the disks being formed with flanges, a rim having beads for engagement by the flanges of the disks, and means having bearing on the face of one of the said disks and engaging the screw threads of the sleeve of the other disk for maintaining the disks in connected relation, the rim being removable from the disks without disconnecting the latter.

3. In a vehicle wheel, a disk having a sleeve projecting from the center thereof and constituting a part of the wheel hub, the outer end of the sleeve being screw-threaded, a second disk having an axially disposed projecting sleeve provided with a recess, the latter sleeve being applied over the sleeve projecting from the first named disk, the sleeves extending in reverse directions and disposed interiorly between the disks, a rim mounted on the peripheral edges of the disks and provided with beads, the disks having peripheral flanges for engagement with the beads of the said rim, and tubular cap having an intermediate flange removably applied over the screw-threaded end of the sleeve of the first named disk and partially extending into and between the two sleeves and engaging the recess of the one sleeve, the flange of the cap exteriorly engaging the outer surface of the first named disk for maintaining the disks in connected relation.

4. In a vehicle wheel, an inner disk having a tubular hub element secured to and projecting therefrom to fit over an axle skein, the said disk having a peripheral annular flange and a plurality of brackets secured adjacent to said flange, an outer disk also having a sleeve secured to and projecting therefrom to fit over the sleeve of the inner disk, the said outer disk also having peripheral flanges, a rim having beads for engagement by the flanges of the disks, and means movably engaging the sleeves secured to the disks and bearing against the outer disk for holding the disks in connected relation, the rim being removable from the disks without disconnecting the disks from one another.

5. In a vehicle wheel, an inner disk having a sleeve secured thereto and provided with an outer threaded end, an outer disk also having a sleeve secured thereto to fit over the sleeve of the inner disk and provided with a recess, the inner disk having an annular flange on the periphery thereof and the outer disk provided with a plurality of peripheral flanges, a rim having beads for engagement by the flanges of the disks, the sleeves of the disks jointly forming a hub organization for engagement over an axle, and a cap having an outer annular flange to bear against the outer disk and an internally screw threaded sleeve for fitting over and engaging the sleeve of the inner disk for maintaining the disks in connected relation on the axle.

6. In a vehicle wheel, an inner disk having a sleeve secured thereto and formed with external threads on the outer end thereof, the inner disk also having a peripheral annular flange, an outer disk having a sleeve secured thereto to fit over the sleeve of the inner disk and jointly form a hub element with the latter, the outer disk having peripheral flanges with recesses adjacent thereto, a rim having beads for engagement by the peripheral flanges of the disks, the outer disk also being provided with bosses at the center thereof, and a cap having an annular flange to bear against the outer side of the outer disk and also formed with an internally threaded sleeve to engage over the threaded end of the sleeve of the inner disk for maintaining the disks in connected relation, the annular flange of the cap being provided with recesses to coöperate with said bosses to secure the cap in applied position.

7. In a vehicle wheel, an inner disk having a sleeve secured to and projecting therefrom and formed with external screw threads on the outer end thereof, the said inner disk also having an outer annular flange, an outer disk having a sleeve secured thereto to fit over the sleeve of the inner disk and form with the latter a hub organization, the outer disk also having peripheral flanges with recesses between them and a plurality of apertures, a rim having beads for engagement by the said flanges of the disks, and a cap having an annular flange and internally screw threaded sleeve to fit over and engage the threaded sleeve of the inner disk to maintain the disks in connected relation, the annular flange of the cap engaging the outer disk.

8. In a vehicle wheel, an inner disk having a sleeve secured to and extending therefrom and provided with external screw threads on the outer end thereof, the said inner disk also having a peripheral annular flange, an outer disk having a sleeve secured to and extending therefrom to fit over the sleeve of the inner disk, the said outer disk also having peripheral flanges, a rim having beads for engagement by the flanges of the disks and also provided with recesses in the under side thereof, and means for maintaining the disks in connected operable relation.

In testimony whereof I have hereunto set my hand in presence of two subscribing witnesses.

WILLIAM F. KLAY.

Witnesses:
W. F. RAMONT,
AL. E. KLAY.